(12) United States Patent
Mukherjee et al.

(10) Patent No.: US 12,095,643 B1
(45) Date of Patent: Sep. 17, 2024

(54) EVENT PUBLICATION FROM COMPUTE NODES INSTALLED IN A CHASSIS OF A MODULAR SERVER TO A CONSOLE OF THE CHASSIS

(71) Applicant: Dell Products L.P., Round Rock, TX (US)

(72) Inventors: Rishi Mukherjee, Bangalore (IN); Ravishankar Kanakapura Nanjundaswamy, Bangalore (IN); Suman Lal Banik, Bangalore (IN)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 18/325,210

(22) Filed: May 30, 2023

(51) Int. Cl.
| | |
|---|---|
| *H04L 43/10* | (2022.01) |
| *H04L 41/0668* | (2022.01) |
| *H04L 43/0805* | (2022.01) |
| *H04L 43/0817* | (2022.01) |
| *H04L 67/1001* | (2022.01) |

(52) U.S. Cl.
CPC .......... *H04L 43/10* (2013.01); *H04L 41/0668* (2013.01); *H04L 43/0805* (2013.01); *H04L 43/0817* (2013.01); *H04L 67/10015* (2022.05)

(58) Field of Classification Search
CPC ............. H04L 41/0668; H04L 43/0805; H04L 43/0817; H04L 43/10; H04L 67/10015
See application file for complete search history.

(56) References Cited

U.S. PATENT DOCUMENTS

| | | | |
|---|---|---|---|
| 8,472,311 B2* | 6/2013 | Rodgers | G06F 11/20 714/4.11 |
| 9,367,414 B2* | 6/2016 | Sevigny | G06F 9/45558 |
| 9,495,259 B2* | 11/2016 | Sevigny | G06F 11/1484 |
| 9,507,566 B2* | 11/2016 | Payne | G06F 7/58 |
| 9,513,946 B2* | 12/2016 | Sevigny | G06F 9/45558 |

(Continued)

FOREIGN PATENT DOCUMENTS

CN 116708461 A * 9/2023

OTHER PUBLICATIONS

Diego Ongaro and John Ousterhout. "In Search of an Understandable Consensus Algorithm (Extended Version)", Stanford University, published May 20, 2014, 18 pages. (Year: 2014).*

Ailidani Ailijiang et al. "Consensus in the Cloud: Paxos Systems Demystified", 2016 25th International Conference on Computer Communication and Networks (ICCCN), Aug. 2016, 10 pages. (Year: 2016).*

(Continued)

*Primary Examiner* — George C Neurauter, Jr.
(74) *Attorney, Agent, or Firm* — Ryan, Mason & Lewis, LLP (57) ABSTRACT

An apparatus comprises a processing device configured to identify compute nodes installed in a chassis of a modular server, and to determine a health status of the compute nodes. The processing device is also configured to designate, based at least in part on the determined health status of the compute nodes, a first one of the compute nodes to act as a primary node for publishing events generated by the compute nodes to a console of the chassis and at least one other compute node to act as a secondary node responsible for acting as the primary node in response to detecting one or more designated conditions. The processing device is further configured to monitor for the designated conditions, and to re-designate a second one of the compute nodes to act as the primary node in response to detecting at least one of the designated conditions.

20 Claims, 10 Drawing Sheets

(56) References Cited

U.S. PATENT DOCUMENTS

| | | | | |
|---|---|---|---|---|
| 9,569,253 | B1* | 2/2017 | Hsieh | G06F 9/466 |
| 10,367,711 | B2* | 7/2019 | Desai | H04L 43/20 |
| 10,474,831 | B1* | 11/2019 | Volkanov | H04L 9/0861 |
| 10,592,342 | B1* | 3/2020 | Sokolova | G06F 11/1425 |
| 10,785,350 | B2* | 9/2020 | Barszczak | H04L 67/1097 |
| 10,810,093 | B1* | 10/2020 | Tucek | H04L 41/30 |
| 11,012,306 | B2* | 5/2021 | Bhattacharyya | G06F 9/44505 |
| 11,095,707 | B2* | 8/2021 | Ponce | H04L 63/101 |
| 11,194,680 | B2* | 12/2021 | Konka | H04L 43/20 |
| 11,681,593 | B2* | 6/2023 | Jindal | G06F 9/45558 |
| | | | | 714/11 |
| 2012/0278801 | A1* | 11/2012 | Nelson | G06F 11/0757 |
| | | | | 718/1 |
| 2016/0077936 | A1* | 3/2016 | Tang | G06F 11/2097 |
| | | | | 714/4.11 |
| 2022/0206900 | A1* | 6/2022 | Zad Tootaghaj | G06F 11/188 |
| 2024/0080239 | A1* | 3/2024 | Abate | H04L 41/0893 |
| 2024/0090154 | A1* | 3/2024 | Harvey | G06F 1/3246 |

OTHER PUBLICATIONS

Kostas Choumas and Thanasis Korakis. "When Raft Meets SDN: How to Elect a Leader over a Network", 2020 6th IEEE International Conference on Network Softwarization (NetSoft), 5 pages. (Year: 2020).*

Dell EMC, "Integrated Dell Remote Access Controller 9," User's Guide Rev. A02, Dec. 2020, 363 pages.

Dell Technologies, "Dell EMC Metro node 7.0.1," Product Guide, 7.0.1, Jul. 2021, 33 pages.

Dell EMC, "ISNMP Reference Guide for iDRAC , Chassis Management Controller and OpenManage Enterprise—Modular Management Software 1.20.00," Rev. A00, Aug. 2020, 155 pages.

Dell Technologies, "Full Access Management of PowerEdge Servers," Solution Brief, Apr. 2022, 2 pages.

Dell EMC, "The integrated Dell Remote Acess Controller 9 (IDRAC9) with Lifecycle Controller," Apr. 6, 2017, 6 pages.

Dell EMC, "Dell Chassis Management Controller Version 6.0 for PowerEdge M1000e," User's Guide, Rev. A02, Sep. 2017, 248 pages.

* cited by examiner

EVENT PUBLICATION FROM COMPUTE NODES INSTALLED IN A CHASSIS OF A MODULAR SERVER TO A CONSOLE OF THE CHASSIS

FIELD

The field relates generally to information processing, and more particularly to managing information processing systems.

BACKGROUND

A given set of electronic equipment configured to provide desired system functionality is often installed in a chassis. Such equipment can include, for example, various arrangements of storage devices, memory modules, processors, circuit boards, interface cards and power supplies used to implement at least a portion of a storage system, a multi-blade server system or other type of information processing system.

The chassis typically complies with established standards of height, width and depth to facilitate mounting of the chassis in an equipment cabinet or other type of equipment rack. For example, standard chassis heights such as 1U, 2U, 3U, 4U and so on are commonly used, where U denotes a unit height of 1.75 inches (1.75") in accordance with the well-known EIA-310-D industry standard.

SUMMARY

Illustrative embodiments of the present disclosure provide techniques for event publication from compute nodes installed in a chassis of a modular server to a console of the chassis.

In one embodiment, an apparatus comprises at least one processing device comprising a processor coupled to a memory. The at least one processing device is configured to identify two or more compute nodes installed in a chassis of a modular server, and to determine a health status of each of the two or more compute nodes installed in the chassis. The at least one processing device is also configured to designate, based at least in part on the determined health status of each of the two or more compute nodes installed in the chassis, a first one of the two or more compute nodes to act as a primary node for publishing events generated by the two or more compute nodes to a console of the chassis and at least one other one of the two or more compute nodes to act as a secondary node responsible for acting as the primary node in response to detecting one or more designated conditions. The at least one processing device is further configured to monitor for the one or more designated conditions, and to re-designate a second one of the two or more compute nodes to act as the primary node for publishing events generated by the two or more compute nodes to the console of the chassis, in response to detecting at least one of the one or more designated conditions.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Information technology (IT) assets, also referred to herein as IT equipment, may include various compute, network and storage hardware or other electronic equipment, and are typically installed in an electronic equipment chassis. The electronic equipment chassis may form part of an equipment cabinet (e.g., a computer cabinet) or equipment rack (e.g., a computer or server rack, also referred to herein simply as a "rack") that is installed in a data center, computer room or other facility. Equipment cabinets or racks provide or have physical electronic equipment chassis that can house multiple pieces of equipment, such as multiple computing devices (e.g., blade or compute servers, storage arrays or other types of storage servers, storage systems, network devices, etc.). As noted above, an electronic equipment chassis typically complies with established standards of height, width and depth to facilitate mounting of electronic equipment in an equipment cabinet or other type of equipment rack. For example, standard chassis heights such as 1U, 2U, 3U, 4U and so on are commonly used, where U denotes a unit height of 1.75 inches (1.75") in accordance with the well-known EIA-310-D industry standard.

Figure 1:
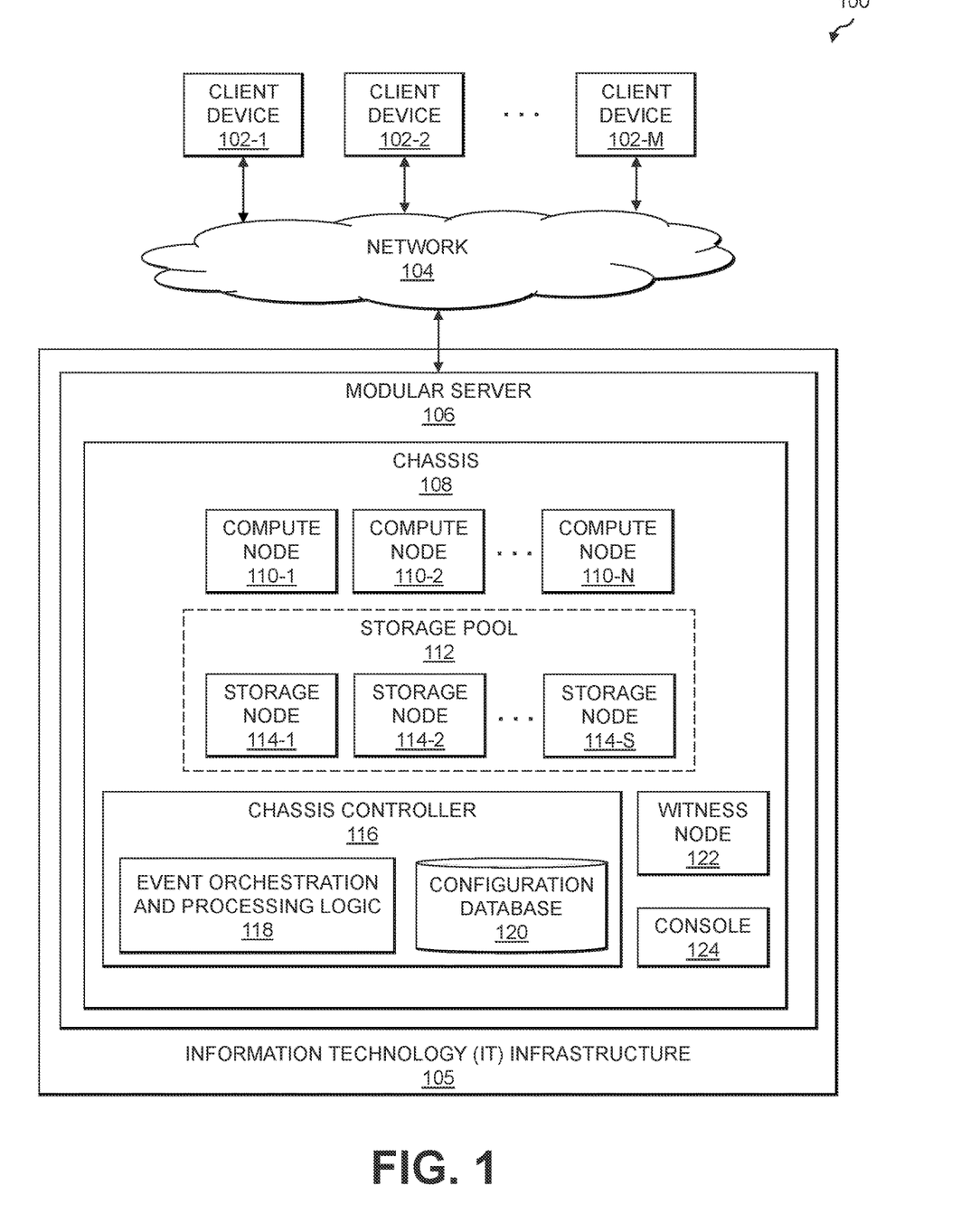
FIG. 1 is a block diagram of an information processing system configured for event publication from compute nodes installed in a chassis of a modular server to a console of the chassis in an illustrative embodiment.

FIG. 1 shows an information processing system 100 configured in accordance with an illustrative embodiment. The information processing system 100 is assumed to be built on at least one processing platform and provides functionality for high availability event propagation for a modular server (e.g., an edge server) comprising a chassis in which multiple compute nodes are installed. The information processing system 100 includes a set of client devices 102-1, 102-2 . . . 102-M (collectively, client devices 102) which are coupled to a network 104. Also coupled to the network 104 is an IT infrastructure 105 comprising one or more IT assets including at least one modular server 106. The IT assets of the IT infrastructure 105 may comprise physical and/or virtual computing resources. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

The modular server 106 includes a chassis 108 in which a set of compute nodes 110-1, 110-2 . . . 110-N (collectively, compute nodes 110) and a storage pool 112 comprising a set of storage nodes 114-1, 114-2, . . . 114-S (collectively, storage nodes 114) are installed. The chassis 108 also includes a chassis controller 116 implementing event orchestration and processing logic 118 and a configuration database 120, as well as a witness node 122 and a console 124. The console 124 provides an interface for the client devices 102 to view information regarding the modular server 106, including but not limited to information related to alerts or other events which are generated by the compute nodes 110, the storage nodes 114 of the storage pool 112 and/or the witness node 122.

The witness node 122 is an optional small compute sled which, as part of some vendor platforms, contains a low power processor (e.g., an Intel Atom® based central processing unit (CPU), etc.). The witness node 122 provides various technical advantages, and may be designed for use in edge computing environments. The witness node 122, for example, may be responsible for breaking ties if two compute sleds (e.g., two of the compute nodes 110 and/or storage nodes 114) get of sync in a vendor supports solution-specific cluster. After power-on and loading a Basic Input-Output System (BIOS), the witness node 122 boots to a host operating system (OS) from an M.2 drive, a Universal Serial Bus (USB) interface, etc. The witness node 122 may be common for all or some designated number of the compute nodes 110 and/or storage nodes 114 which are installed in the chassis 108. In some embodiments, for example, the witness node 122 is common for up to four different compute nodes 110 and/or storage nodes 114 which are installed in the chassis 108. In other embodiments, the witness node 122 may be used in common for other numbers of the compute nodes 110 and/or the storage nodes 114. The power state and control of the witness node 122 is independent of the compute nodes 110 and the storage nodes 114. In other words, the witness node 122 may be powered on or off independent of the power state of sleds in which the compute nodes 110 and/or storage nodes 114 are installed. In some cases, the witness node 122 is installed in a dedicated slot in the chassis 108. There may be only a single witness sled in the whole chassis 108 which is dedicated for use with the witness node 122. The witness node 122 may be managed by a microcontroller unit (MCU) referred to as the witness manager. The witness manager facilitates controlling the functions and communication between a chassis manager (e.g., the chassis controller 116) and the witness node 122. Such functions include, but are not limited to, presence detection to the chassis manager. The witness manager indirectly connects to a Baseboard Management Controller (BMC) through the chassis manager, and is responsible for monitoring the witness sled in which the witness node 122 is installed. Such monitoring includes monitoring the CPU temperature of the witness sled.

In some embodiments, the modular server 106 is used for an enterprise system. For example, an enterprise may have various IT assets, including the modular server 106, which it operates in the IT infrastructure 105 (e.g., for running one or more software applications or other workloads of the enterprise) and which may be accessed by users of the enterprise system via the client devices 102. As used herein, the term "enterprise system" is intended to be construed broadly to include any group of systems or other computing devices. For example, the IT assets of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

Although not explicitly shown in FIG. 1, one or more input-output devices such as keyboards, displays or other types of input-output devices may be used to support one or more user interfaces to the modular server 106, as well as to support communication between the modular server 106 and other related systems and devices not explicitly shown.

In some embodiments, the client devices 102 are assumed to be associated with system administrators, IT managers or other authorized personnel responsible for managing the IT assets of the IT infrastructure 105, including the modular server 106. For example, a given one of the client devices 102 may be operated by a user to access a graphical user interface (GUI) provided by the console 124 of the modular server 106 to manage one or more of the compute nodes 110 and/or one or more of the storage nodes 114 of the storage pool 112. In some embodiments, functionality of the chassis controller 116 (e.g., the event orchestration and processing logic 118) may be implemented outside the chassis controller 116 (e.g., on one or more other ones of the IT assets of the IT infrastructure 105, on one or more of the client devices 102, an external server or cloud-based system, etc.).

In some embodiments, the client devices 102, the compute nodes 110, the storage nodes 114 of the storage pool 112, the chassis controller 116, the witness node 122 and the console 124 may implement host agents that are configured for automated transmission of information regarding the modular server 106 (e.g., health or other status information, alerts or other events, etc.). It should be noted that a "host agent" as this term is generally used herein may comprise an automated entity, such as a software entity running on a processing device. Accordingly, a host agent need not be a human entity.

The chassis controller 116 in the FIG. 1 embodiment is assumed to be implemented using at least one processing device. Each such processing device generally comprises at least one processor and an associated memory, and implements one or more functional modules or logic for controlling certain features of the modular server 106. In the FIG. 1 embodiment, the chassis controller 116 implements the event orchestration and processing logic 118. The event orchestration and processing logic 118 is configured to select and designate, from among the compute nodes 110, a given compute node to act as a "primary" node. The event orchestration and processing logic 118 is also configured to designate other ones of the compute nodes 110 to act as "secondary" nodes." The primary node is made responsible for publishing alerts or other events (e.g., generated by the witness node 122, the compute nodes 110 and/or the storage nodes 114) to the console 124. The secondary nodes may be configured to take on the role of the primary node, in the event that the currently designated primary node is offline or unavailable, if the state or health of the compute nodes 110 changes, in accordance with a load balancing algorithm, etc. The selection and designation of the primary and secondary nodes may be based at least in part on monitored health or other status information for the compute nodes, with such information being stored in the configuration database 120. The configuration database 120 may also store information regarding the currently designated primary and secondary nodes, parameters or thresholds for determining relative health of different ones of the compute nodes 110, a schedule for updating the designations of the primary and secondary nodes, etc. In some embodiments, one or more of the storage systems utilized to implement the configuration database 120 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

The event orchestration and processing logic 118 is further configured to monitor the health of the compute nodes 110, and to determine whether and when to update the designations of the primary and secondary nodes. In some embodiments, this includes monitoring for keep alive or heartbeat messages, and determining whether the compute nodes are available based on whether a keep alive or heartbeat message is received within some designated threshold interval. The event orchestration and processing logic 118 may also implement a load balancing algorithm, to update the designation of the primary and secondary nodes to balance the load across the compute nodes 110 over time.

It is to be appreciated that the particular arrangement of the client devices 102, the IT infrastructure 105 and the modular server 106 illustrated in the FIG. 1 embodiment is presented by way of example only, and alternative arrangements can be used in other embodiments. As discussed above, for example, the modular server 106 (or portions of components thereof, such as one or more of the event orchestration and processing logic 118 and the configuration database 120) may in some embodiments be implemented internal to one or more of the client devices 102 and/or other IT assets of the IT infrastructure 105.

At least portions of the event orchestration and processing logic 118 may be implemented at least in part in the form of software that is stored in memory and executed by a processor.

The modular server 106 and other portions of the information processing system 100, as will be described in further detail below, may be part of cloud infrastructure.

The modular server 106 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the modular server 106 or components thereof (e.g., the compute nodes 110, the storage pool 112, the storage nodes 114, the chassis controller 116, the event orchestration and processing logic 118, the configuration database 120, the witness node 122 and the console 124) may be implemented on respective distinct processing platforms, although numerous other arrangements are possible. For example, in some embodiments at least portions of the modular server 106 and one or more of the client devices 102 are implemented on the same processing platform. A given client device (e.g., 102-1) can therefore be implemented at least in part within at least one processing platform that implements at least a portion of the modular server 106.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, and the modular server 106, or portions or components thereof, to reside in different data centers. Numerous other distributed implementations are possible.

Additional examples of processing platforms utilized to implement the information processing system 100 in illustrative embodiments will be described in more detail below in conjunction with FIGS. 6 and 7.

It is to be appreciated that these and other features of illustrative embodiments are presented by way of example only, and should not be construed as limiting in any way.

It is to be understood that the particular set of elements shown in FIG. 1 for high availability event propagation for chassis devices is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
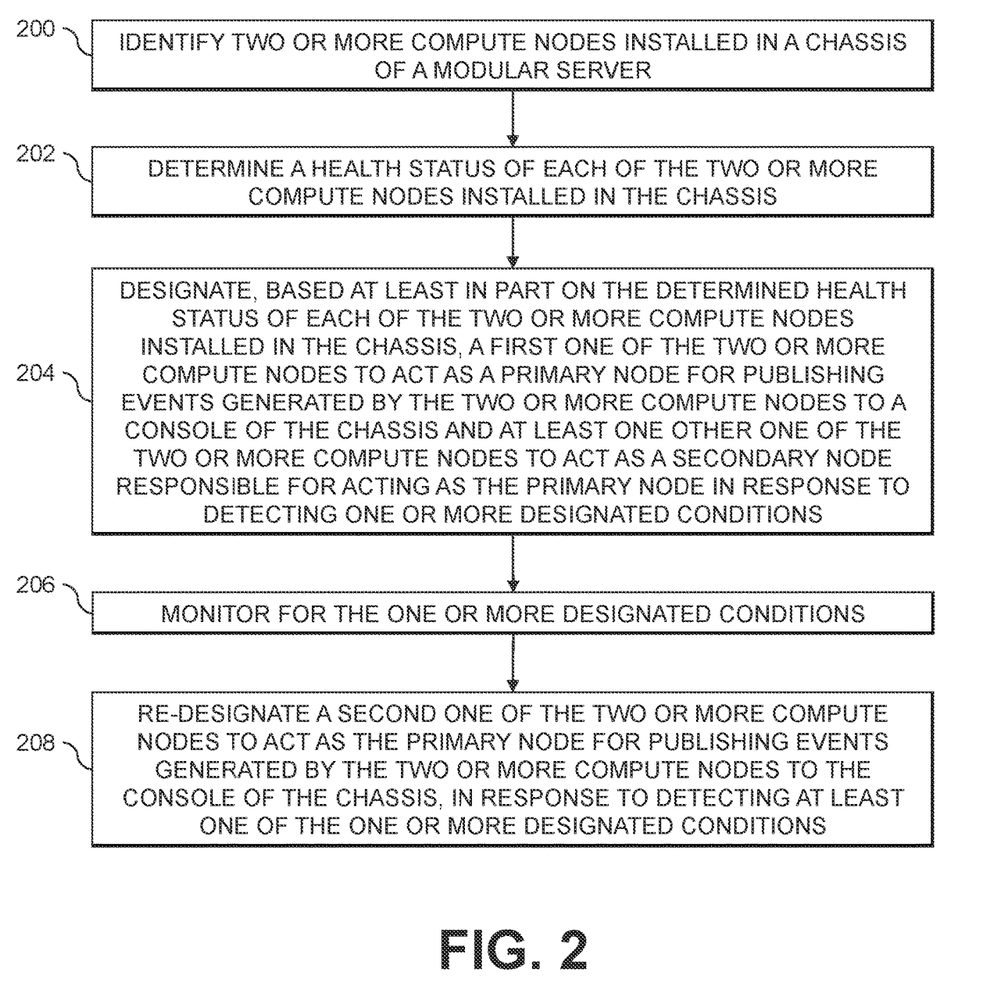
FIG. 2 is a flow diagram of an exemplary process for event publication from compute nodes installed in a chassis of a modular server to a console of the chassis in an illustrative embodiment.

An exemplary process for high availability event propagation for chassis devices will now be described in more detail with reference to the flow diagram of FIG. 2. It is to be understood that this particular process is only an example, and that additional or alternative processes for high availability event propagation for chassis devices may be used in other embodiments.

In this embodiment, the process includes steps 200 through 208. These steps are assumed to be performed by the chassis controller 116 of the chassis 108 of the modular server 106 utilizing the event orchestration and processing logic 118 and the configuration database 120. The process begins with step 200, identifying two or more compute nodes installed in a chassis of a modular server. A health status of each of the two or more compute nodes installed in the chassis is determined in step 202. In step 204, based at least in part on the health status determined in step 202, a first one of the two or more compute nodes is designated to act as a primary node for publishing events generated by the two or more compute nodes to a console of the chassis and at least one other one of the two or more compute nodes to act as a secondary node responsible for acting as the primary node in response to detecting one or more designated conditions. The FIG. 2 process continues with step 206, monitoring for the one or more designated conditions. In step 208, a second one of the two or more compute nodes is re-designated to act as the primary node for publishing events generated by the two or more compute nodes to the console of the chassis, in response to detecting at least one of the one or more designated conditions.

In some embodiments, the modular server comprises a witness node installed in the chassis, wherein at least a subset of the events published to the console comprises events generated by the witness node which are published to remote access controllers of at least two of the two or more compute nodes, the at least two of the two or more compute nodes including the first compute node designated as the primary node and the at least one other one of the two or more compute nodes designated to act as the secondary node.

The determined health status for a given one of the two or more compute nodes may comprise an operating system state of the given compute node. The operating system state may comprise at least one of a maintenance mode and a quarantine mode. The one or more designated conditions may comprise detecting that the first compute node designated to act as the primary node is in at least one of the maintenance mode and the quarantine mode. Determining the health status of each of the two or more compute nodes installed in the chassis may comprise monitoring for heartbeat messages received from respective ones of the two or more compute nodes, and the one or more designated conditions may comprise determining whether a heartbeat message has been received from the first compute node, designated to act as the primary node, within a designated threshold period of time. Determining the health status of each of the two or more compute nodes installed in the chassis may also or alternatively comprise obtaining health information from baseboard management controllers associated with the two or more compute nodes.

The one or more designated conditions may comprise determining that a given one of the two or more compute nodes designated to act as the secondary node has a first health status (e.g., an unhealthy status) and that the first compute node designated to act as the primary node has a second health status (e.g., a healthy status). The one or more designated conditions may also or alternatively comprise determining that the first compute node designated to act as the primary node is at least one of offline and unavailable. The one or more designated conditions may further or alternatively comprise detecting expiration of a designated period of time, the designated period of time being configurable for achieving load balancing among the two or more compute nodes. The second compute node re-designated to act as the primary node may be selected utilizing a round-robin selection algorithm.

In an edge computing scenario having minimal network connectivity paths for managed devices is a desired expectation. In aligning with this philosophy, having a management network part for a chassis manager and a witness node is an expensive design. In some cases, multiple compute sleds which are part of a chassis of a modular server (e.g., compute sleds 1 through N) communicate with a same witness node via a chassis manager or chassis controller. Critical events generated in the witness node may be published by the chassis manager to all connected instances of a remote access controller (e.g., Integrated Dell Remote Access Controller (iDRAC) instances) running on the compute nodes. Multiple critical events of the same type which populate across all connected instances of the remote access controller, however, lead to duplication in a console (e.g., used by client devices as an interface for management of the modular server comprising the chassis in which the compute nodes and witness node run). This consumes network bandwidth of all the compute nodes in order to log the same event in the console, and also occupies storage bandwidth for the multiple duplicate events. Further, this can lead to triggering of multiple alert actions for the same event. As one solution, an end-user may access the chassis manager to select and identify a particular remote access controller instance (e.g., an iDRAC running on one of the compute nodes) to be made responsible for propagating the witness node events. As such selection is user driven, it does not consider the state of the remote access controllers or their associated compute nodes, and thus may be sub-optimal.

In illustrative embodiments, technical solutions are provided whereby a chassis manager or other chassis controller is configured with an event orchestrator that is configured to select one of the available compute nodes as a "primary" node for witness node event propagation, and for designating other ones of the available compute nodes as "secondary" nodes. The selection of the primary node may be based on various factors or attributes, such as the health, state (e.g., maintenance, quarantine, etc.), etc. of the different available compute nodes. The event orchestrator is also configured to monitor the health of the available compute nodes, to switch the selection of the primary node (e.g., which is responsible for propagating events from the witness node) based at least in part on the monitored health (e.g., an operating system (OS) state like maintenance or quarantine states).

The technical solutions in some embodiments create or instantiate an event orchestrator in a chassis manager, where the event orchestrator is responsible for publishing alerts or other events to compute nodes which are configured in a clustered environment (e.g., in a chassis of a modular server in which the chassis manager and compute nodes run). The event orchestrator has intelligence for selecting and configuring different compute nodes (e.g., sleds of the chassis in which the compute nodes are installed) as primary and secondary, based at least in part on health rankings of the compute nodes, current states of the compute nodes, etc.

The chassis manager, possibly via the event orchestrator implemented thereon, may be responsible for receiving keep alive or heartbeat messages from the different compute sleds (e.g., the compute nodes installed therein) to determine whether particular ones of the compute sleds are active or not. If the chassis manager is still receiving keep alive or heartbeat messages from the compute sled in which the currently selected primary compute node is installed (e.g., indicating that the currently selected primary compute node is healthy), then the event orchestrator will propagate alerts or other events (e.g., generated by different components of the compute nodes and/or the witness node) to the compute sled in which the currently selected primary compute node is installed.

In order to have an equal or more balance load on the different compute sleds (e.g., the different compute nodes installed therein, or remote access controllers such as iDRAC instances running on the different compute nodes), the chassis manager may provide functionality for periodically changing the selection and designation of the primary and secondary compute nodes. In some embodiments, the chassis manager implements a round-robin based algorithm (e.g., with a configurable time slice) to change the selection and designation of the primary and secondary compute nodes responsible for propagating witness node alerts or other events. Such functionality may be enabled only when at least some designated threshold number of the compute nodes are in a healthy state.

At any point in time, if the chassis manager has not received a heartbeat message from the compute sled in which the currently designated primary compute node is installed for some designated period of time (e.g., after expiration of a designated heartbeat interval), then the chassis manager may mark the currently designated primary compute node as inactive or offline and select a new primary compute node from among remaining ones of the compute nodes currently designated as secondary compute nodes.

Along with the keep alive or heartbeat messages from the compute sleds in which the compute nodes are installed, the chassis manager may continually monitor the health and state (e.g., node OS states) of the available compute nodes based on information received from baseboard management controllers (BMCs) of the different available compute nodes. If the compute sled in which the currently designated primary compute node is installed is undergoing maintenance or is otherwise considered unhealthy, its BMC can inform the chassis manager of its state transition. Based on this and other information, the chassis manager may choose to change the selection and designation of primary and secondary compute nodes.

The chassis manager may further include or otherwise consider the timestamps as part of witness node events in order to avoid sending duplicate events of the same type. Based on the timestamp information, the chassis manager may determine whether a given alert or other event (e.g., generated by different components of the compute nodes and/or the witness node) is a duplicate or not, and propagates the given alert or other event to the compute sled in which the currently designated primary compute node is installed accordingly. The primary compute node is responsible for forwarding the given alert or other event to the console, which helps to ensure that the console receives the given alert or other event only from the primary compute node.

Figure 3:
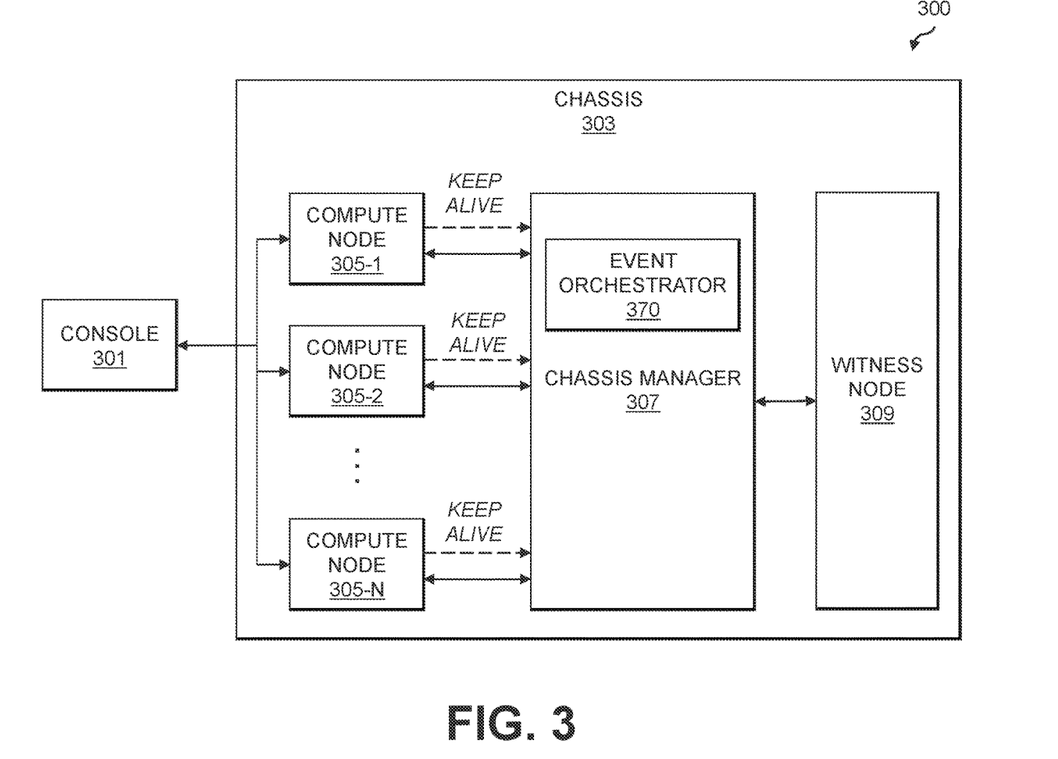
FIG. 3 shows a system including compute nodes of a chassis which provide keep alive messages to a chassis controller implementing an event orchestrator in an illustrative embodiment.

FIG. 3 shows a system 300 including a console 301 configured to receive information (e.g., published alerts or other events) from a chassis 303. The chassis 303 includes a set of compute nodes 305-1, 305-2 . . . 305-N (collectively, compute nodes 305) which are coupled to a chassis manager 307 implementing an event orchestrator 370. The chassis manager 307 is also coupled with a witness node 309. Alerts or other events produced by the witness node 309 and/or one or more of the compute nodes 305 are published to the console 301. To do so, the event orchestrator 370 of the chassis manager 307 selects and designates one of the compute nodes 305 as a primary node which is responsible for publishing the alerts or other events (e.g., from the witness node 309 and/or one or more of the compute nodes 305) to the console 301, and designates other ones of the compute nodes 305 as secondary nodes (e.g., which may take on the role of the primary node in the event that the currently designated primary node is unhealthy or unavailable). By having only one of the compute nodes 305 designated as the primary node, duplicate alerts or other events are not published to the console 301. This saves network and storage bandwidth, among other resources.

The compute nodes 305 (e.g., via remote access controllers such as iDRAC instances running thereon, or BMCs associated with the compute nodes 305) send keep alive or heartbeat messages to the chassis manager 307. If the chassis manager 307 fails to receive a keep alive or heartbeat message from one of the compute nodes 305 for at least some designated period of time, then that compute node may be marked as unavailable or offline. It should be noted that, in some cases, the chassis manager may configure the currently designated primary node to send keep alive or heartbeat messages at a greater frequency (e.g., a shorter interval) than those ones of the compute nodes 305 currently designated as secondary nodes. If the currently designated primary node is marked as unavailable or offline, then the chassis manager 307 may select and designate one of the secondary nodes as a new primary node responsible for publishing alerts or other events to the console 301. The chassis manager 307 may also or alternatively monitor the health of the compute nodes 305, and change the selection and designation of the primary node in response to detecting one or more conditions (e.g., that the currently designated primary node is determined to be unhealthy, if one of the currently designated secondary nodes is determined to be healthier than the currently designated primary node, etc.). The chassis manager 307 may further or alternatively change the selection and designation of the primary node in different intervals so as to balance the load (e.g., the primary node responsibility) among the compute nodes 305. Various algorithms may be used for balancing the load, such as a round robin selection algorithm (e.g., among available and healthy ones of the compute nodes 305).

Figure 4A:
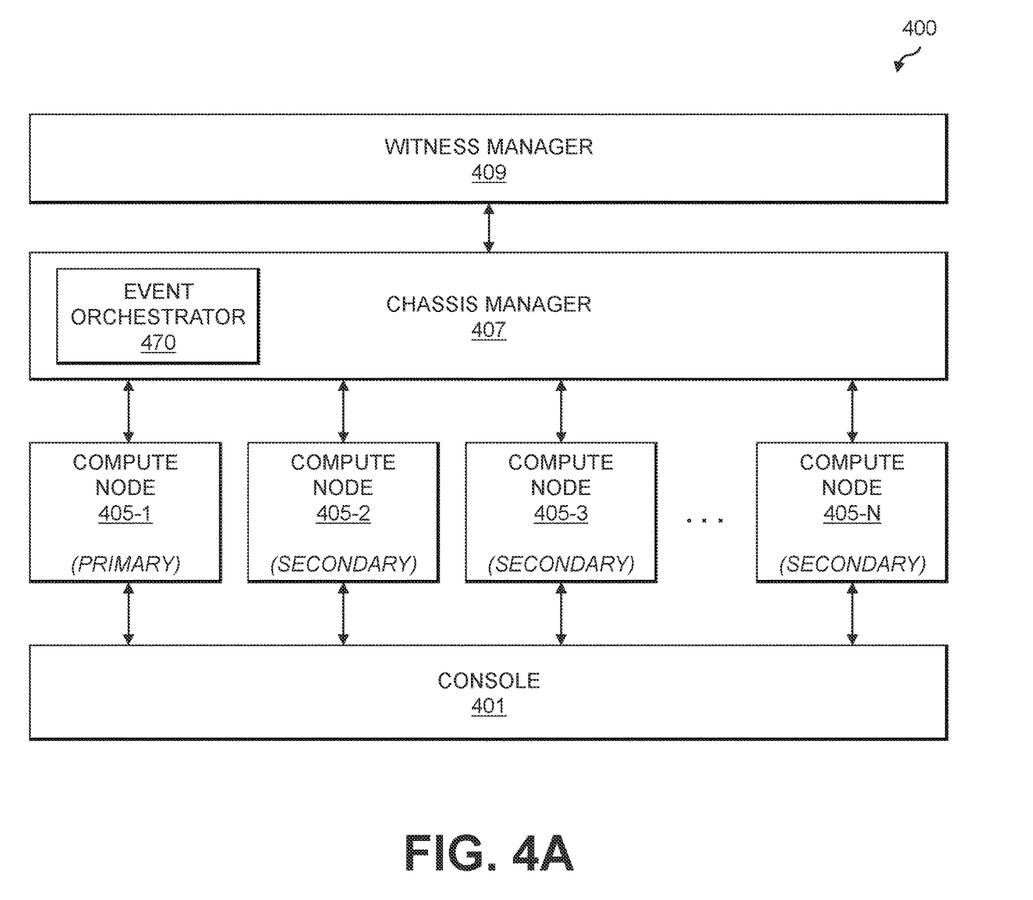
FIGS. 4A and 4B show a process for updating selection and designation of primary and secondary nodes by a chassis controller of a chassis in response to changing health of compute nodes installed in the chassis in an illustrative embodiment.
Figure 4B:
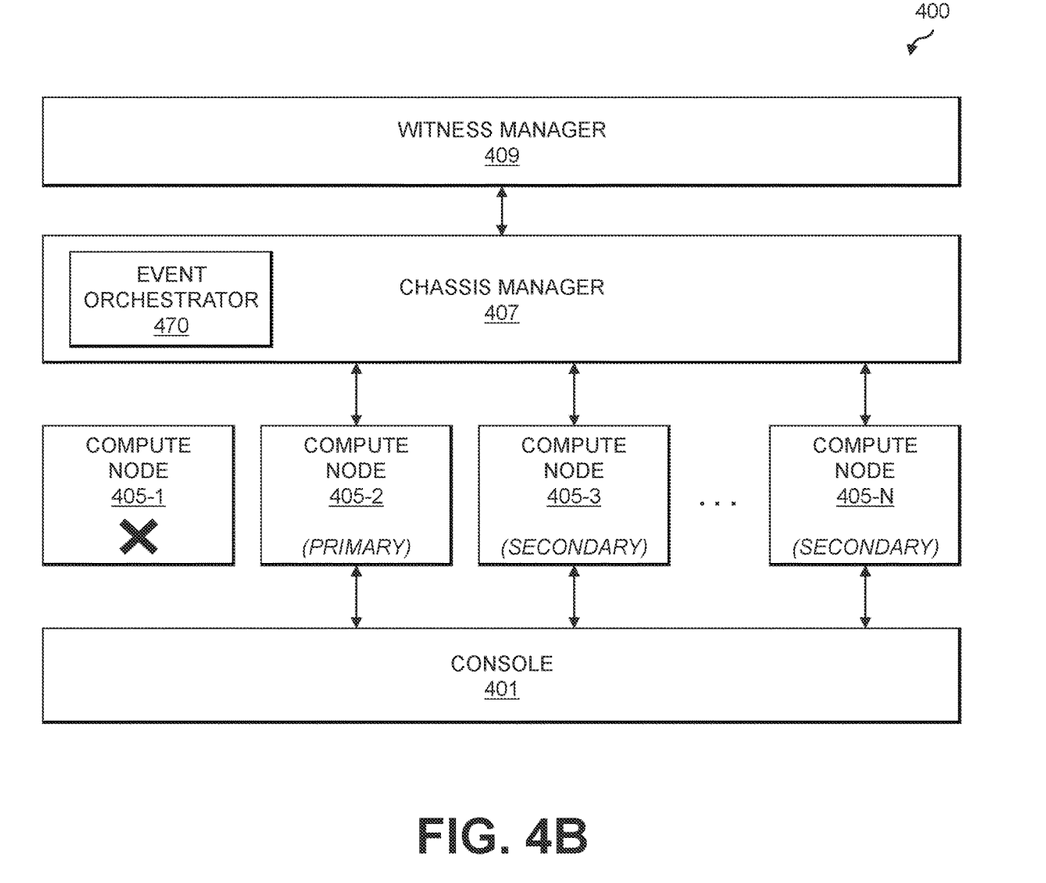

FIGS. 4A and 4B show respective views of a system 400 illustrating change in selection and designation of primary and secondary nodes. The system 400 includes a console

401, a set of compute nodes 405-1, 405-2, 405-3, . . . 405-N (collectively, compute nodes 405), a chassis manager 407 implementing an event orchestrator 470, and a witness manager 409. As shown in FIG. 4A, initially the compute node 405-1 is selected and designated as the primary node, while remaining ones of the compute nodes 405 are designated as secondary nodes. As shown in FIG. 4B, responsive to the compute node 405-1 going offline (e.g., detected when the chassis manager 407 fails to receive a keep alive or heartbeat message within some designated interval), the compute node 405-2 is selected and designated as the new primary node. The remaining ones of the compute nodes 405 (with the exception of the compute node 405-1, which is offline) continue to be designated as secondary nodes.

Figure 5A:
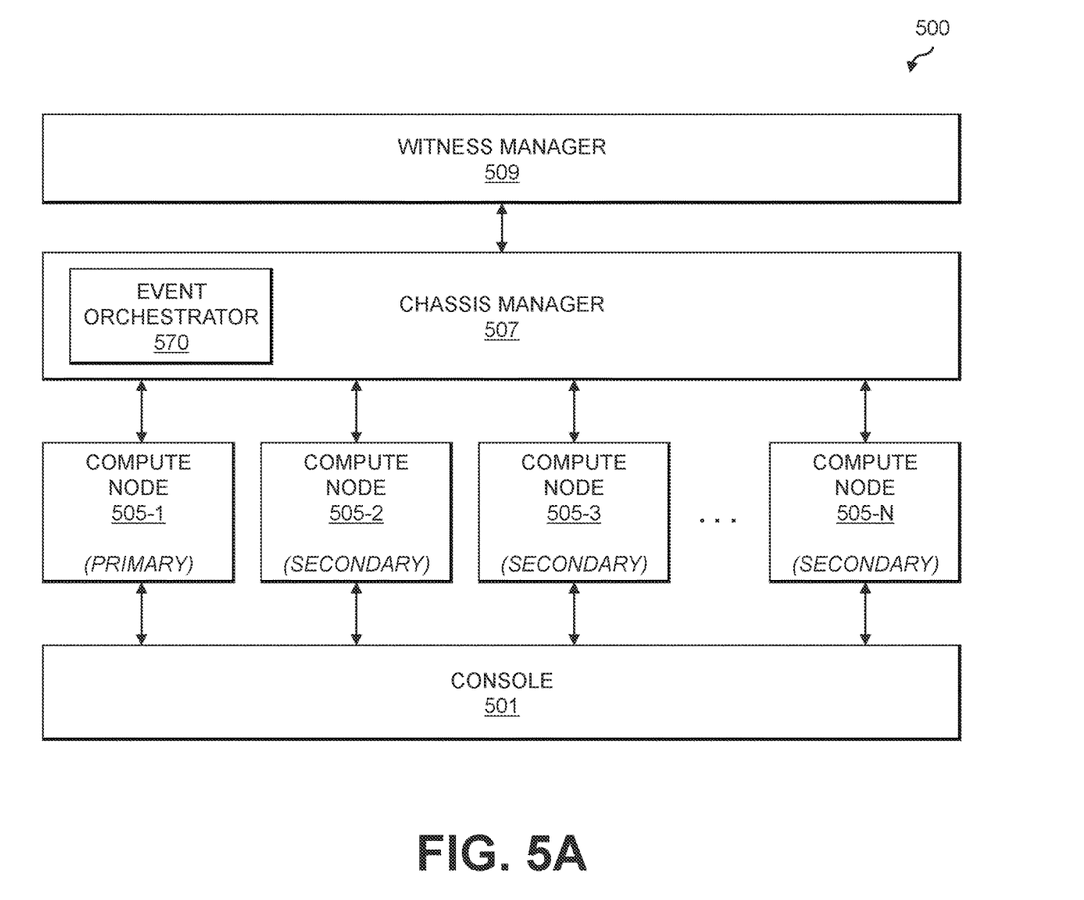
FIGS. 5A-5C show a process for updating selection and designation of primary and secondary nodes by a chassis controller of a chassis to implement load balancing among compute nodes installed in the chassis in an illustrative embodiment.
Figure 5B:
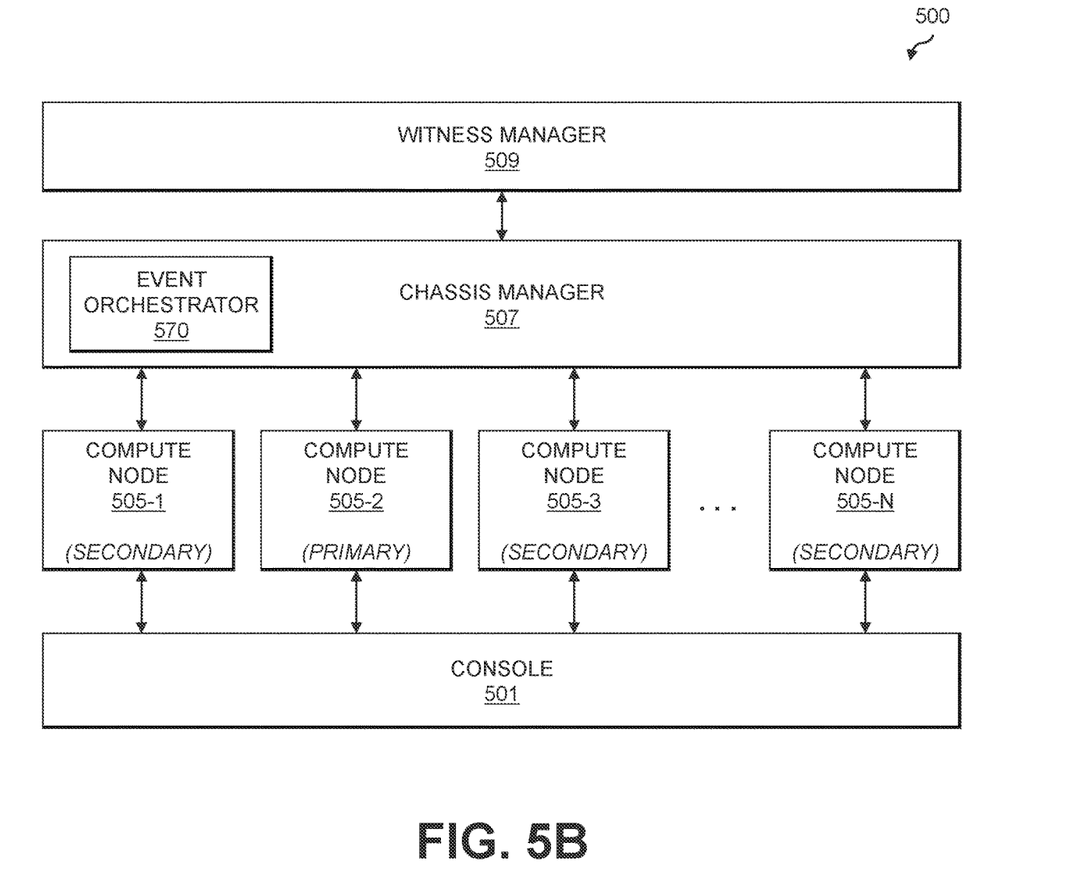
Figure 5C:
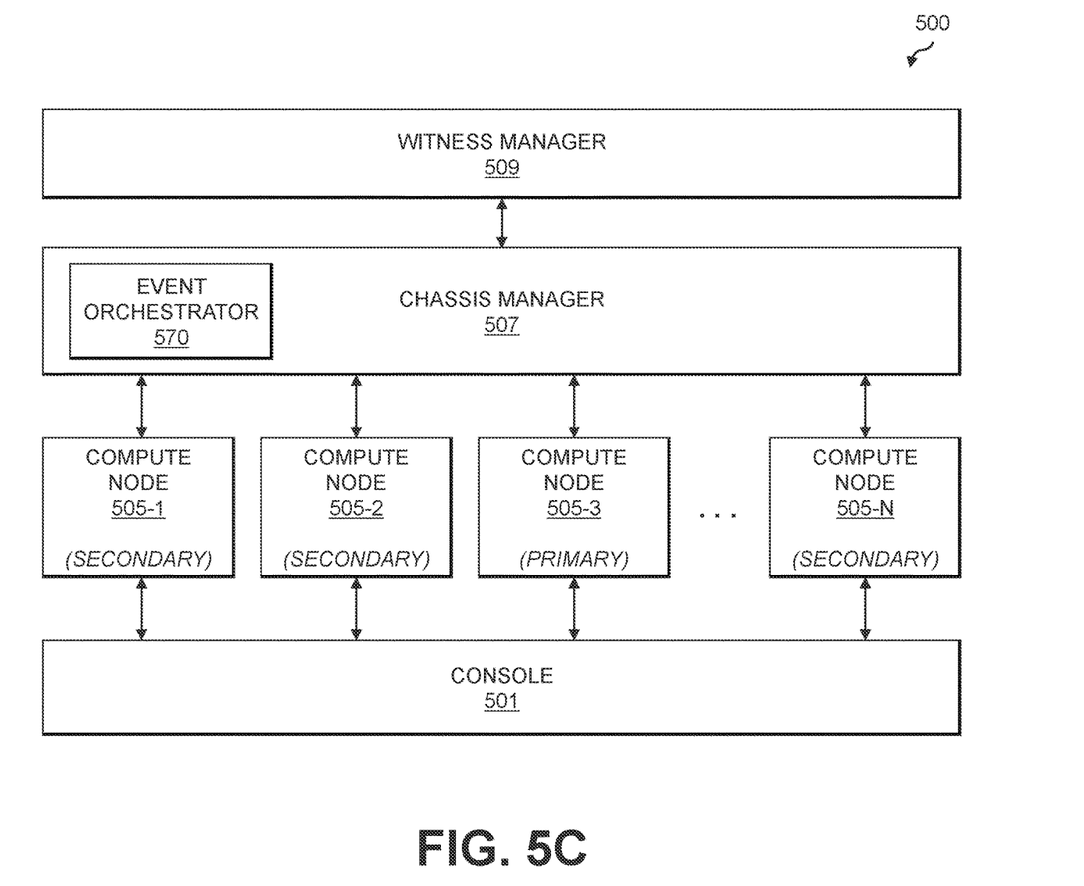

FIGS. 5A-5C show respective views of a system 500 illustrating change in selection and designation of primary and secondary nodes in subsequent intervals (e.g., in a round-robin selection algorithm). The system 500 includes a console 501, a set of compute nodes 505-1, 505-2, 505-3, . . . 505-N (collectively, compute nodes 505), a chassis manager 507 implementing an event orchestrator 570, and a witness manager 509. As shown in FIG. 5A, initially the compute node 505-1 is selected and designated as the primary node, while remaining ones of the compute nodes 505 are designated as secondary nodes. After expiration of some designated time interval, as shown in FIG. 5B, the selection and designation of the primary and secondary nodes may be changed such that the compute node 505-2 is selected and designated as the primary node while other ones of the compute nodes 505 are designated as secondary nodes. After another expiration of the designated time interval, as shown in FIG. 5C, the selection and designation of the primary and secondary nodes may again be changed such that the compute node 505-3 is selected and designated as the primary node while other ones of the compute nodes 505 are designated as secondary nodes. This process may continue for subsequent expirations of the designated time interval, until each of the compute nodes 505 has been selected as the primary node for an instance of the designate time interval, at which time the cycle may repeat beginning with the compute node 505-1.

The technical solutions described herein provide functionality for creating event orchestration in a chassis manager, which is configured to contextually select, from among available compute nodes, a primary compute node to act as the primary source of event propagation for a witness node. The technical solutions also provide functionality for creating high availability of event processing in the chassis manager by dynamically switching which of the compute nodes is selected or designated as the primary compute node responsible for propagating alerts or other events of a witness node (e.g., based on OS state or other monitored health information).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for high availability event propagation for chassis devices will now be described in greater detail with reference to FIGS. 6 and 7. Although described in the context of system 100, these platforms may also be used to implement at least portions of other information processing systems in other embodiments.

Figure 6:
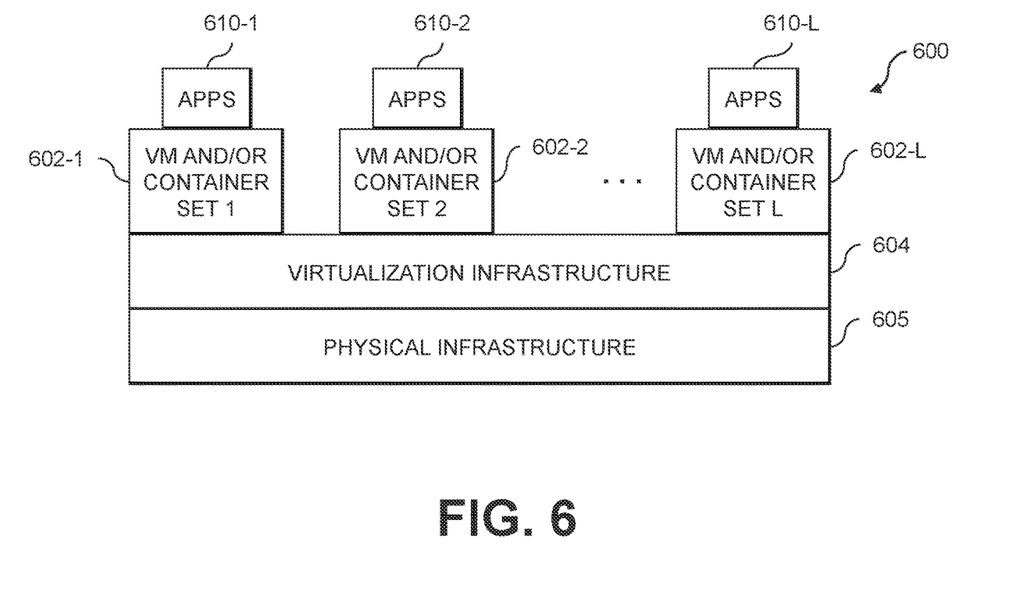
FIGS. 6 and 7 show examples of processing platforms that may be utilized to implement at least a portion of an information processing system in illustrative embodiments.
Figure 7:
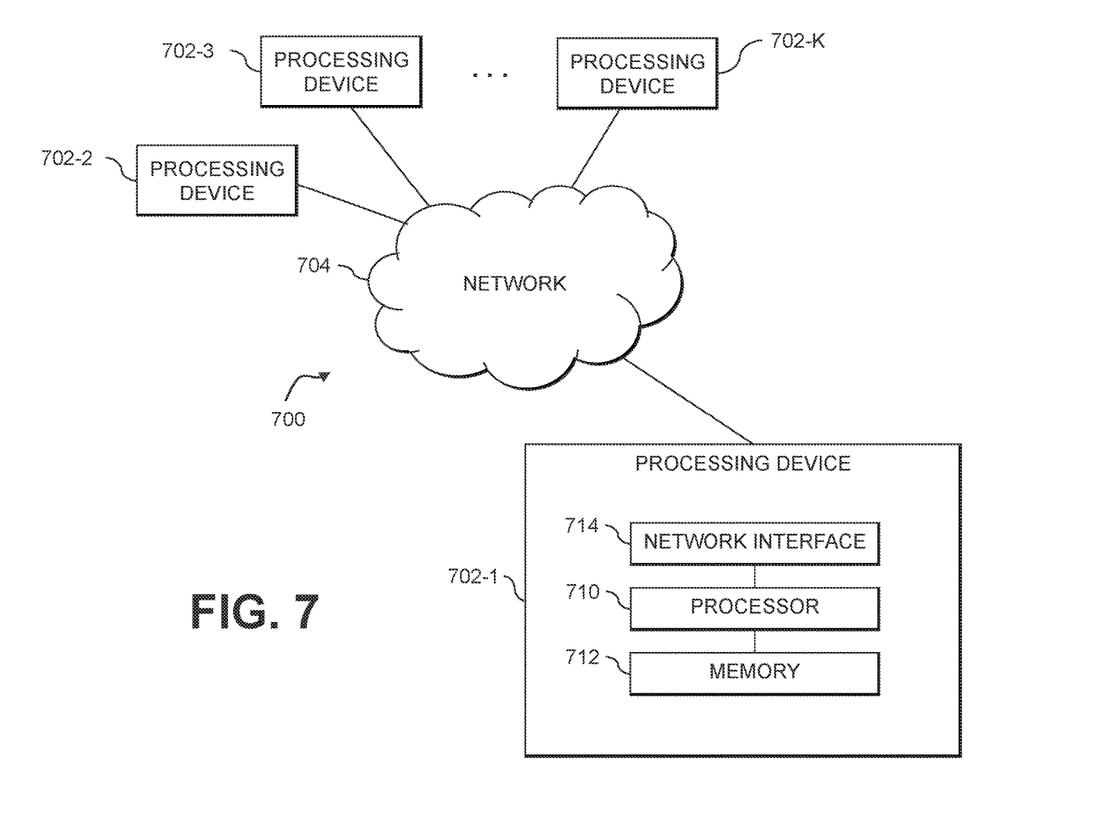

FIG. 6 shows an example processing platform comprising cloud infrastructure 600. The cloud infrastructure 600 comprises a combination of physical and virtual processing resources that may be utilized to implement at least a portion of the information processing system 100 in FIG. 1. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for high availability event propagation for chassis devices as disclosed herein are illustratively implemented in the form of software running on one or more processing devices. It should again be emphasized that the above-described embodiments are presented for purposes of illustration only. Many variations and other alternative embodiments may be used. For example, the disclosed techniques are applicable to a wide variety of other types of information processing systems, IT assets, chassis configurations, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured:
        to identify two or more compute nodes installed in a chassis of a modular server;
        to determine a health status of each of the two or more compute nodes installed in the chassis;
        to designate, based at least in part on the determined health status of each of the two or more compute nodes installed in the chassis, a first one of the two or more compute nodes to act as a primary node that is responsible for publishing events generated by the two or more compute nodes to a console of the chassis and at least one other one of the two or more compute nodes to act as a secondary node that is responsible for acting as the primary node in response to detecting one or more designated conditions;
        to monitor for the one or more designated conditions; and
        to re-designate a second one of the two or more compute nodes to act as the primary node that is responsible for publishing events generated by the two or more compute nodes to the console of the chassis, in response to detecting at least one of the one or more designated conditions;
    wherein the primary node publishes one or more of the events to the console of the chassis.

2. The apparatus of claim 1 wherein the at least one processing device comprises a chassis controller of the chassis of the modular server.

3. The apparatus of claim 1 wherein the modular server further comprises a witness node installed in the chassis.

4. The apparatus of claim 3 wherein at least a subset of the events published to the console comprises events generated by the witness node which are published to remote access controllers of at least two of the two or more compute nodes, said at least two of the two or more compute nodes including the first compute node designated to act as the primary node and said at least one other one of the two or more compute nodes designated to act as the secondary node.

5. The apparatus of claim 1 wherein the determined health status for a given one of the two or more compute nodes comprises an operating system state of the given compute node.

6. The apparatus of claim 5 wherein the operating system state comprises at least one of a maintenance mode and a quarantine mode.

7. The apparatus of claim 6 wherein the one or more designated conditions comprises detecting that the first compute node designated to act as the primary node is in at least one of the maintenance mode and the quarantine mode.

8. The apparatus of claim 1 wherein determining the health status of each of the two or more compute nodes installed in the chassis comprises monitoring for heartbeat messages received from respective ones of the two or more compute nodes.

9. The apparatus of claim 8 wherein the one or more designated conditions comprises determining whether a heartbeat message has been received from the first compute node, designated to act as the primary node, within a designated threshold period of time.

10. The apparatus of claim 1 wherein determining the health status of each of the two or more compute nodes installed in the chassis comprises obtaining health information from baseboard management controllers associated with the two or more compute nodes.

11. The apparatus of claim 1 wherein the one or more designated conditions comprises determining that a given one of said at least one other one of the two or more compute nodes designated to act as the secondary node has a first health status and that the first compute node designated to act as the primary node has a second health status.

12. The apparatus of claim 1 wherein the one or more designated conditions comprises determining that the first compute node designated to act as the primary node is at least one of offline and unavailable.

13. The apparatus of claim 1 wherein the one or more designated conditions comprises detecting expiration of a designated period of time, the designated period of time being configurable for achieving load balancing among the two or more compute nodes.

14. The apparatus of claim 13 wherein the second compute node re-designated to act as the primary node is selected utilizing a round-robin selection algorithm.

15. A computer program product comprising a non-transitory processor-readable storage medium having stored therein program code of one or more software programs, wherein the program code when executed by at least one processing device causes the at least one processing device:
to identify two or more compute nodes installed in a chassis of a modular server;
to determine a health status of each of the two or more compute nodes installed in the chassis;
to designate, based at least in part on the determined health status of each of the two or more compute nodes installed in the chassis, a first one of the two or more compute nodes to act as a primary node that is responsible for publishing events generated by the two or more compute nodes to a console of the chassis and at least one other one of the two or more compute nodes to act as a secondary node that is responsible for acting as the primary node in response to detecting one or more designated conditions;
to monitor for the one or more designated conditions; and
to re-designate a second one of the two or more compute nodes to act as the primary node that is responsible for publishing events generated by the two or more compute nodes to the console of the chassis, in response to detecting at least one of the one or more designated conditions;
wherein the primary node publishes one or more of the events to the console of the chassis.

16. The computer program product of claim 15 wherein the modular server further comprises a witness node installed in the chassis, and wherein at least a subset of the events published to the console comprises events generated by the witness node which are published to remote access controllers of at least two of the two or more compute nodes, said at least two of the two or more compute nodes including the first compute node designated to act as the primary node and said at least one other one of the two or more compute nodes designated to act as the secondary node.

17. The computer program product of claim 15 wherein the one or more designated conditions comprises detecting expiration of a designated period of time, the designated period of time being configurable for achieving load balancing among the two or more compute nodes.

18. A method comprising:
identifying two or more compute nodes installed in a chassis of a modular server;
determining a health status of each of the two or more compute nodes installed in the chassis;
designating, based at least in part on the determined health status of each of the two or more compute nodes installed in the chassis, a first one of the two or more compute nodes to act as a primary node that is responsible for publishing events generated by the two or more compute nodes to a console of the chassis and at least one other one of the two or more compute nodes to act as a secondary node that is responsible for acting as the primary node in response to detecting one or more designated conditions;
monitoring for the one or more designated conditions; and
re-designating a second one of the two or more compute nodes to act as the primary node that is responsible for publishing events generated by the two or more compute nodes to the console of the chassis, in response to detecting at least one of the one or more designated conditions;
wherein the primary node publishes one or more of the events to the console of the chassis; and
wherein the method is performed by at least one processing device comprising a processor coupled to a memory.

19. The method of claim 18 wherein the modular server further comprises a witness node installed in the chassis, and wherein at least a subset of the events published to the console comprises events generated by the witness node which are published to remote access controllers of at least two of the two or more compute nodes, said at least two of the two or more compute nodes including the first compute node designated to act as the primary node and said at least one other one of the two or more compute nodes designated to act as the secondary node.

20. The method of claim 18 wherein the one or more designated conditions comprises detecting expiration of a designated period of time, the designated period of time being configurable for achieving load balancing among the two or more compute nodes.

* * * * *